US011126930B2

(12) United States Patent
Fu et al.

(10) Patent No.: US 11,126,930 B2
(45) Date of Patent: Sep. 21, 2021

(54) CODE COMPLETION FOR DYNAMICALLY-TYPED PROGRAMMING LANGUAGES USING MACHINE LEARNING

(71) Applicant: MICROSOFT TECHNOLOGY LICENSING, LLC., Redmond, WA (US)

(72) Inventors: Shengyu Fu, Redmond, WA (US); Neelakantan Sundaresan, Bellevue, WA (US); Jason Wang, Bellevue, WA (US); Ying Zhao, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 16/396,686

(22) Filed: Apr. 27, 2019

(65) Prior Publication Data
US 2020/0272426 A1    Aug. 27, 2020

Related U.S. Application Data

(60) Provisional application No. 62/664,191, filed on Apr. 29, 2018.

(51) Int. Cl.
*G06F 8/30* (2018.01)
*G06N 20/00* (2019.01)

(52) U.S. Cl.
CPC ............. *G06N 20/00* (2019.01); *G06F 8/30* (2013.01)

(58) Field of Classification Search
CPC ..... G06F 8/30; G06F 8/33; G06F 8/20; G06F 8/34; G06F 8/447; G06F 8/75; G06N 20/00
See application file for complete search history.

(56) References Cited

U.S. PATENT DOCUMENTS

| 7,171,352 B2 | 1/2007 | Chang et al. |
| 8,201,139 B2 | 6/2012 | Chang et al. |
| 2008/0320444 A1* | 12/2008 | Meijer ...................... G06F 8/33 717/110 |
| 2011/0283257 A1 | 11/2011 | Charisius et al. |
| 2013/0294651 A1 | 11/2013 | Zhou et al. |

(Continued)

FOREIGN PATENT DOCUMENTS

WO    2015022009 A1    2/2015

OTHER PUBLICATIONS

"Final Office Action Issued in U.S. Appl. No. 15/939,742", dated Nov. 5, 2019, 26 Pages.

(Continued)

*Primary Examiner* — S. Sough
*Assistant Examiner* — Cheneca Smith

(57) ABSTRACT

A code completion system predicts candidates to complete a method invocation in a source code program written in a dynamically-typed programming language. A pseudo type is generated for each variable in the source code program to approximate the runtime type of the variable. The pseudo type is then used to group a set of method invocations into a classification that can be modeled by an n-order Markov chain model. The n-order Markov chain model is used to predict candidate methods more likely to complete a method invocation in a dynamically-typed programming language.

20 Claims, 7 Drawing Sheets

(56) References Cited

U.S. PATENT DOCUMENTS

| | | | | |
|---|---|---|---|---|
| 2014/0173563 | A1* | 6/2014 | Dias | G06F 8/36 |
| | | | | 717/123 |
| 2015/0378692 | A1* | 12/2015 | Dang | G06F 8/33 |
| | | | | 717/106 |
| 2017/0371629 | A1* | 12/2017 | Chacko | G06F 8/36 |
| 2018/0101771 | A1 | 4/2018 | Schwarm et al. | |
| 2018/0113780 | A1* | 4/2018 | Kim | G06N 3/02 |
| 2019/0227774 | A1 | 7/2019 | Banuelos et al. | |
| 2019/0303108 | A1 | 10/2019 | Fu et al. | |
| 2019/0303109 | A1 | 10/2019 | Fu et al. | |
| 2019/0332968 | A1 | 10/2019 | Fu et al. | |

OTHER PUBLICATIONS

"Non Final Office Action Issued in U.S. Appl. No. 15/939,742", dated Jun. 10, 2019, 19 Pages.

Agrawal, et al , "Mining Association Rules between Sets of Items in Large Databases", In Proceedings of the ACM SIGMOD Conference on Management of Data, May 25, 1993, 10 Pages.

Alnusair, et al., "Effective API Navigation and Reuse", In Proceedings of IEEE International Conference on Information Reuse and Integration, Aug. 4, 2010, pp. 1-8.

Bruch, et al., "Learning from examples to improve code completion systems", In Proceedings of the 7th Joint Meeting of the European Software Engineering Conference and the ACM SIGSOFT Symposium on the Foundations of Software Engineering,, Aug. 23, 2009, 10 Pages.

Cergani, et al., "Addressing Scalability in API Method Call Analytics", In Proceedings of the 2nd International Workshop on Software Analytics, ACM, Nov. 13, 2016, 7 Pages.

Cover, et al., "Nearest Neighbor Pattern Classification", In Transactions on Information Theory, vol. 13, Issue 1, Jan. 1967, pp. 21-27.

D'Souza, et al., "Collective Intelligence for Smarter API Recommendations in Python", In 16th International Working Conference on Source Code Analysis and Manipulation (SCAM), Oct. 2-3, 2016, pp. 51-60.

Gvero, et al., "Complete Completion Using Types and Weights", In Proceedings of the 34th ACM SIGPLAN Conference on Programming Language Design and Implementation, Jun. 16, 2013, pp. 27-38.

Mandelin, et al., "Jungloid Mining: Helping to Navigate the API Jungle", In Proceedings of the ACM SIGPLAN conference on Programming language design and implementation, Jun. 12-15, 2005, 14 Pages.

Marasoiu et al., "An Empirical Investigation of Code Completion Usage by Professional Software Developers", In Proceedings of 26th Annual Workshop on Psychology of Programming Interest Group, Jul. 15, 2015, 12 Pages.

Mobasher, et al., "Using Sequential and Non-Sequential Pattern in Predictive web Usage Mining Tasks*", In Proceedings of International Conference on Data Mining, Dec. 9, 2002, 4 Pages.

Murphy, et al., "How Are Java Software Developers Using the Elipse IDE?", In Journal of IEEE Software, vol. 23, Issue 4, Jul. 17, 2006, pp. 76-83.

Perelman, et al., "Type Directed Completion of Partial Expressions", In Proceedings of the 33rd ACM SIGPLAN Conference on Programming Language Design and Implementation, Jun. 11, 2012, pp. 275-286.

Proksch, et al., "Intelligent Code Completion With Bayesian Network", In Transactions on Software Engineering and Methodology (TOSEM), vol. 25 Issue 1, Dec. 2015, 31 Pages.

Radev, "Evaluating Web-based Question Answering Systems", In Proceedings of the Third International Conference on Language Resources and Evaluation, May 29, 2002, 4 Pages.

Raychev, et al., "Code Completion With Statistical Language Models", In Proceedings of the 35th ACM SIGPLAN Conference on Programming Language Design and Implementation, Jun. 9, 2014, pp. 419-428.

Robillard, Martin P., "What Makes APIs Hard to Learn? Answers from Developers", In Journal of IEEE Software, vol. 26, Issue 6, Nov. 2009, pp. 27-34.

Shani, et al., "An MDP-based Recommender System", In Journal of Machine Learning Research, Sep. 6, 2005, pp. 1265-1295.

Zhong, et al., "MAPO: Mining and Recommending API Usage Patterns", In Proceedings of the 23rd European Conference on Object-Oriented Programming, Jul. 6, 2009, 25 Pages.

Zimdars, et al., "Using Temporal Data for Making Recommendations", In Proceedings of the Seventeenth Conference on Uncertainty in Artificial Intelligence, Aug. 2, 2001, pp. 580-588.

"International Search Report and Written Opinion Issued in PCT Application No. PCT/US19/013417", dated Apr. 4, 2019, 17 Pages.

Thummalapenta, et al., "Parseweb", In Proceedings of 22nd IEEE/ACM International Conference on Automated Software Engineering (ASE 2007), pp. 204-213.

"Notice of Allowance Issued in U.S. Appl. No. 15/939,742", dated Jan. 28, 2020, 16 Pages.

Sebastiani, Fabrizio, "Machine Learning in Automated Text Categorization", In Journal of ACM Computing Surveys, vol. 34, Issue 1, Mar. 2002, pp. 1-47.

"Notice of Allowance Issued in U.S. Appl. No. 16/207,952", dated Dec. 16, 2019, 14 Pages.

Li, et al., "Semantic Knowledge in Word Completion", In Proceedings of the 7th International ACM SIGACCESS Conference on Computers and accessibility, Oct. 9, 2005, pp. 121-128.

"International Search Report and Written Opinion Issued in PCT Application No. PCT/US2020/015984", dated May 25, 2020, 10 Pages.

Zhang et al., "Automatic Parameter Recommendation for Practical API Usage", In Proceedings of the 34th International Conference on Software Engineering, Jun. 2, 2012, pp. 826-836.

"International Search Report and Written Opinion Issued in PCT Application No. PCT/US20/023038", dated Jul. 14, 2020, 14 Pages.

Savchenko, et al., "Statistical Approach to Increase Source Code Completion Accuracy", In Proceedings of the International Andrei Ershov Memorial Conference on Perspectives of System Informatics, Jan. 18, 2018, pp. 352-363.

Svyatkovskiy, et al., "Pythia: AI-Assisted Code Completion System", In Journal of Computing Research Repository, Nov. 29, 2019, 13 Pages.

Non-Final Office Action Issued in U.S. Appl. No. 16/360,008, dated Jun. 19, 2020, 33 Pages.

Asaduzzaman et al., "Exploring API Method Parameter Recommendations", In Proceedings of the IEEE International Conference on Software Maitenance and Evolution, Sep. 29, 2015, 10 Pages.

"Notice of Allowance Issued in U.S. Appl. No. 16/360,008", dated Dec. 28, 2020, 18 Pages.

"Final Office Action Issued in U.S. Appl. No. 16/360,008", dated Oct. 5, 2020, 32 Pages.

* cited by examiner

```
SOURCE CODE 200
10  import socket
11  # create a socket:
12
13  s = socket.socket( socket.AF_INET, socket.SOCK_STREAM)
14
15  # set up connection:
16  s.connect( ('www.sina.com.cn', 80) )
17
18  s.send(b 'GET / HTTP/1.1\r\nHost: www.sina.com.cn\r\nConnection: close\r\n\r\n')
19  buffer = [ ]
20  while True:
21      # receive data from the socket
22      d = s.recv(1024)
23      if d:
24          buffer.append(d)
25      else:
26          break
27
28  s.close()
```

| | |
|---|---|
| SpanStart: | 202 |
| IsInConditional: | false |
| ClassInvoked: | socket.socket |
| Method/PropertyInvoked: | connect |

204 — 206, 208, 210, 212

| | |
|---|---|
| SpanStart: | 520 |
| IsInConditional: | false |
| ClassInvoked: | list |
| Method/PropertyInvoked: | append |

```
[{
"Repo": "C:\\tmp\\python_test\\test",
"Project": "C:\\tmp\\python_test\\test",
"Document": "socket_sample.py",
"References": {
   "socket" : {
     "socket" : {
         "spanStart" : [98],
         "isInConditional": [0]
     },
     "AF_INET": {
         "spanStart" : [112],
         "isInConditional": [0]
     },
     "SOCK_STREAM" : {
         "spanStart" : [128],
         "isInConditional": [0]
     }
   },
   "socket.socket": {
     "connect": {
         "spanStart" : [202],
         "isInConditional": [0]
     },
     "send": {
         "spanStart" : [294],
         "isInConditional": [0]
     },
     "recv": {
         "spanStart" : [463],
         "isInConditional": [0]
     },
     "close": {
         "spanStart" : [563],
         "isInConditional": [0]
     }
   },
   "list": {
     "append": {
         "spanStart" : [526],
         "isInConditional": [0]
     }
   }
}}]
```

JSON FILE 230

*FIG. 2B*

CODE COMPLETION FOR DYNAMICALLY-TYPED PROGRAMMING LANGUAGES USING MACHINE LEARNING

CROSS-REFERENCE TO RELATED APPLICATIONS

The present application claims the benefit of U.S. Provisional Application having Ser. No. 62/664,191 filed on Apr. 29, 2018.

BACKGROUND

Software development environments are often used to aid software developers (i.e., users, programmers, etc.) to develop program code. The software development environment may include a source code editor and other tools that the developers utilize to write and test their programs. Some software development environments provide assistance for the developer to write code by automatically presenting a list of possible candidates based on one or more characters (e.g., letters, symbols, etc.) that a developer has typed into a source code editor. A popup menu may appear with several suggested code elements, phrases, or entities that the developer may utilize. This assistance is beneficial since it speeds up the development time and reduces common errors, such as typos. However, the automatic code completion feature may be problematic when there is a large list of candidates which may not be relevant and/or which may be too lengthy for a developer to browse through to find the right element.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A code completion system predicts candidates to complete a method invocation in source code program written in a dynamically-typed programming language. Code completion is an automatic process of predicting the rest of a code fragment as the user is typing. Code completion speeds up the code development time by generating candidates to complete a code fragment when it correctly predicts a method name that a user intends to enter after a few characters have been typed. In a dynamically-typed language it is not always possible to know the actual type associated with a method at compile time. Instead, a pseudo type is created and associated with each method. The pseudo type is then used to group a set of method invocations into a classification in order to construct Markov chain models representing the sequences of method invocations within the same pseudo type.

An n-order Markov chain model is generated for each pseudo type based on the context information extracted from method invocations associated with the same pseudo type. The Markov chain models are used in code completion to predict the method that is more likely to be used in a current invocation based on preceding method invocations of the same pseudo type in the same document and the context in which the current method invocation is made.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 2A is an exemplary source code listing in a dynamically-typed programming language used to illustrate the extraction of features for the training dataset.

FIG. 2B is an exemplary JavaScript Object Notation (JSON) file listing the extracted features from the source code shown in FIG. 2A.

DETAILED DESCRIPTION

Overview

Figure 1:
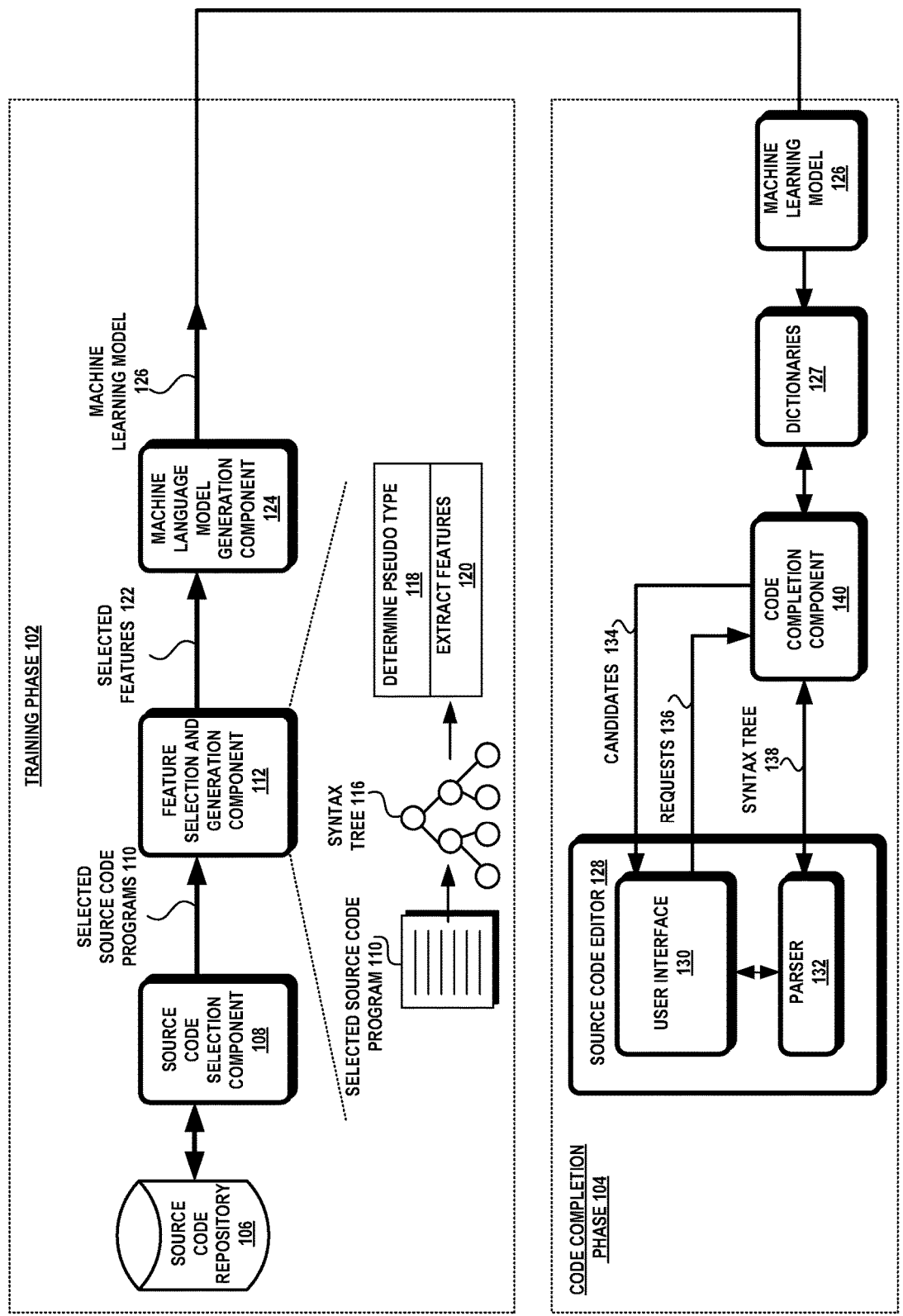
FIG. 1 illustrates an exemplary system including a training phase used to train a machine learning model and a code completion phase that uses the machine learning model in code completion system.

The subject matter disclosed pertains to a code completion system that predicts candidates to complete a method invocation in source code program written in a dynamically-typed programming language. A method invocation is the issuance of a call to a method or property of a class. A class may include a large number of methods and/or properties thereby making it impractical to list all the methods and properties of a class as candidates. In order to generate candidates more likely to complete a source code statement invoking a method, the context in which the method is invoked and the type associated with the method is used to predict the more likely candidates.

Code completion is an automatic process of predicting the rest of a code fragment as the user is typing. Code completion speeds up the code development time by generating candidates to complete a code fragment when it correctly predicts a method name that a user intends to enter after a few characters have been typed.

Method invocations differ with respect to the context in which they are used in a program. The context of a method invocation may include one or more of the following: the spatial position of the method call in the program (i.e., span start); an indication of whether the method call is inside a conditional branch (e.g., if-then-else program construct); the name of the class; and the name of the method or property invoked. This context information is collected from various programs and used to detect sequential patterns in the method invocations of a class. The context information is used as the features that train a machine learning model to predict the next method to complete a code fragment.

A dynamically-typed programming language has a type system that supports dynamic typing. In dynamic typing, a majority of type checking is performed at runtime. In dynamic typing, a type is associated with a runtime value and not a named variable or field. A variable is dynamically typed when the type of the object it will name is not specified at compile time. A statically-typed programming language has a type system that supports static typing. In static typing, the type of a variable is known at compile time and the types are associated with named variables and fields and not values. Examples of dynamically-typed languages include Javascript, SmallTalk, Python, Ruby, Lisp, Perl, and PHP. Examples of statically-typed languages include Java, C, C++, C#, Ada, Fortran, and Pascal.

In a dynamically-typed language it is not always possible to know the actual type associated with a method at compile time. A type or data type is an attribute that indicates the kind of data that a value can have. A type is determined by a type system associated with the programming language. A type system is a set of rules that assigns a type to the various program constructs.

It is impractical to run or nearly interpret the program to discover the types. Instead, a pseudo type is created and associated with each method. A pseudo type is an approximation of a type that is based on a static analysis of the program without executing the program with real inputs. The pseudo type is then used to group a set of method invocations into a classification in order to construct Markov chain models representing the sequences of method invocations within the same classification. In one aspect, a pseudo type estimates the class associated with a program element.

In one aspect, an n-order Markov chain model is generated for each pseudo type based on the context information extracted from method invocations associated with the same pseudo type. The Markov chain models are used in code completion to predict the method that is more likely to be used in a current invocation based on preceding method invocations of the same pseudo type in the same document and the context in which the current method invocation is made.

The disclosure is described with respect to the Python dynamically-typed programming language. However, it should be understood that the techniques described herein are not limited to Python and can be readily applied to other dynamically-typed programming languages. Furthermore, it should be noted that the term "method invocation" refers to methods, functions and properties of a class that are invoked.

Attention now turns to a further discussion of the system, devices, components, and methods utilized in a code completion system.

Machine Learning Code Completion System

FIG. 1 illustrates a block diagram of an exemplary system 100 in which various aspects of the invention may be practiced. As shown in FIG. 1, system 100 includes a training phase 102 which generates a machine learning model 126 and a code completion phase 104 that utilizes the machine learning model 126 in a real-time code completion system. The training phase 102 may utilize a source code selection component 108, a feature selection and generation component 112, and a machine language model generation component 124. The code completion phase 104 may utilize a source code editor 128, a code completion component 140, and the machine learning model 126.

In the training phase 102, the source code selection component 108 extracts selected source code programs 110 from a source code repository 106 to generate training and validation datasets. The source code repository 106 may be a file archive and web hosting facility that stores large amounts of source code either privately or publicly. The source code repository 106 can be structured as a version control system, such as GIT, Mercurial, etc. The source code programs residing in the source code repository 106 vary and may be written in different dynamic programming languages. The source code selection component 108 obtains source code programs written in the same dynamic programming language. The source code programs can come from different domains, such as without limitation, scientific computing, web development, dataflow programming, machine learning, and the like but are written in the same language.

The feature selection and generation component 112 extracts certain features from each method invocation in the selected source code program which are used to train and test the machine learning model. The feature and generation component 112 parses each selected source code program into a syntax tree 116 from which the component 112 determines a pseudo type 118 to associate with a method invocation and to extract features 120 related to the context of the method invocation. The feature selection and generation component 112 may include a front-end compiler, parser, or a language compiler (not shown) to compile a selected source code program into a syntax tree 116.

In one aspect, the features include the span start of a method invocation (i.e., position in the source code relative to the start of the source code file), an indication of whether the method invocation is used in an if-conditional statement, the class associated with the invoked method, and the name of the method invoked.

A syntax tree or abstract syntax tree 116 represents the syntactic structure of the program in a hierarchical or tree structure. The syntax tree 116 is a data structure that includes nodes that represent a construct in the grammar of the programming language of the program. The syntax tree 116 is used by the feature selection and generation component 112 which extracts certain features of a method invocation. A feature is a discriminable characteristic of the method invocation that represents the context in which a method is called. There are several features extracted for each method invocation and these features comprise a feature vector. A portion of the feature vectors generated for a particular pseudo type can then be used as training data to train the machine learning model 126. Another portion of the feature vectors 120 can be used to test the model 126.

In object-oriented programming, a type system is a set of rules that define a type to a program element (e.g., method, variable, expressions, etc.). A type is an abstract interface. A class represents an implementation of a type. The class is a concrete data structure and a collection of methods and as such, a method is associated with a class. In order to predict a method to complete a code fragment, the class that the method is associated with needs to be known and this can be inferred from the type associated with the method invocation. However, the type is often not be known at compile time.

The feature selection and generation component 112 determines the class of a method based on a pseudo type 118. In a dynamically-typed programming language, the type associated with the return value of a method invocation may not be known until runtime. As such, there is no type associated with a method invocation before runtime. To discover the type at compile time would require that the source code program be nearly interpreted or run to discover the type. This would be impractical and expensive to perform. In order to compensate for this obstacle, the feature selection and generation component 112 approximates the type through a proxy or pseudo type. The pseudo type is used to group a set of methods into a same class.

The machine learning model 126 is then configured for use in a code completion system. The code completion phase 104 may include a source code editor 128, a code completion component 140, dictionaries 127, and the machine learning model 126. The source code editor 128 may include a user interface 130 and a parser 132. In one or more aspects, code completion may be a function or feature integrated into a source code editor and/or integrated development environment (IDE). Code completion may be embodied as a tool or feature that can be an add-on, plug-in, extension and/or component of a source code editor and/or IDE.

The user interface 130 includes a set of features or functions for writing and editing a source code program. The user interface 130 may utilize a pop-up window to present a list of possible candidates for completion thereby allowing a developer to browse through the candidates and to select one from the list. The parser 132 reads the source code in the source code editor 128 and generates a corresponding syntax tree 138. The parser 132 also updates the syntax tree 138 as the developer creates and edits the source code in the source code editor 128 in order to recognize the different program elements (e.g., assignment statements, method invocations, etc.) in their respective context.

At certain points in the editing process, the user interface 130 will detect that the user has entered a particular input or marker character which will initiate the code completion process. In one aspect, a period "." is used to initiate code completion for a method name. The code completion component 140 will receive a request 136 for candidates to complete the code fragment with a method name. The code completion component 140 receives the current syntax tree 138 from the source code editor 128.

The code completion component 140 determines a pseudo type for the object of the method invocation and extracts the previous method invocations for the same pseudo type from the syntax tree of the source code program in the source code editor 128. The code completion component 140 utilizes one or more dictionaries 127 which contain the models 126 in a lookup table format. In one aspect, there is one model for each pseudo type. A dictionary 127 is accessed based on a pseudo type and a sequence of method invocations preceding the marker character from the same pseudo type. The corresponding entry has a list of methods ranked by their predicted probabilities. The code completion component 140 obtains one or more candidates 134 from a dictionary 127 which are returned back to the user interface 130. In one aspect, at most five candidates are obtained from the dictionary 127. The user interface 130 in turn provides the candidates to the developer. In one aspect, the user interface 130 may provide the candidates from the code completion component 140 with other candidates from other code completion tools and/or provide the candidates from the machine-learning-based code completion component separately. The techniques describe herein are not constrained to any particular mechanism for providing the candidates to a developer and the manner in which the candidates are displayed to the user (e.g., pop-up window, etc.).

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention. For example, the training phase 102 may be executed in one computing environment and the code completion phase 104 may be executed in the same computing environment or in a separate computing environment.

Figure 2C:
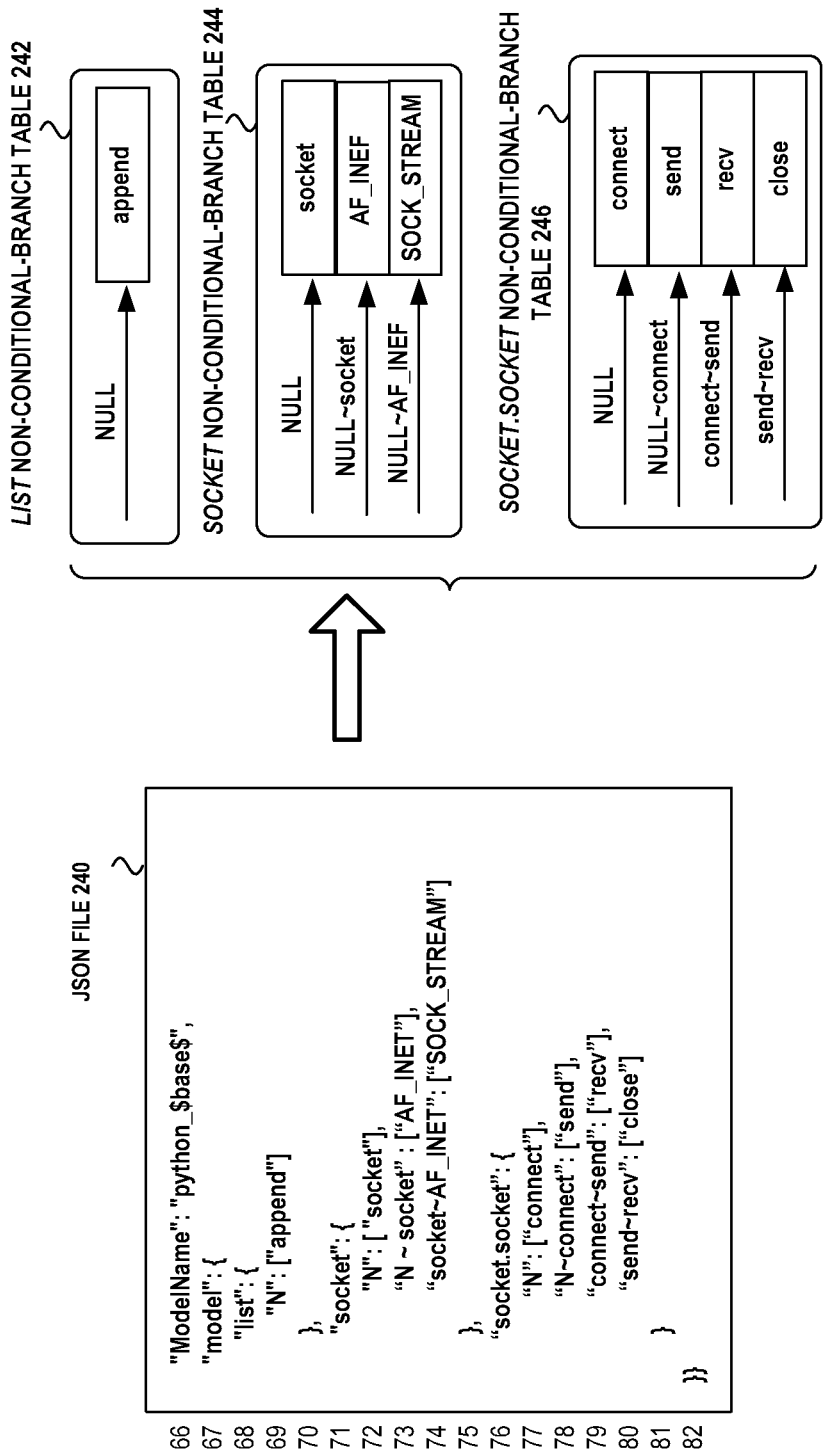
FIG. 2C illustrates an exemplary machine learning model embodied as a JSON file and as dictionaries.

FIGS. 2A-2C illustrate the extraction of training and validation datasets from a selected source code program to train the machine learning model. FIG. 2A shows a portion of source code written in the Python programming language. FIG. 2B illustrates a JavaScript Object Notation (JSON) file representing the extracted features from the source code shown in FIG. 2A. FIG. 2C illustrates the machine learning model representing the source code shown in FIG. 2A.

Referring to FIG. 2A, there is shown an exemplary source code program 200. Line 10 includes an import statement that imports the class "socket." Lines 11, 15, and 21 are comments. Line 13 is an assignment statement that assigns the return value from the method call socket.socket to the variable "s". The variable "s" is an object that represents an instance of the class, socket.socket. The method invocation contains the parameters, socket.AF_INET and socket.SOCK_STREAM. The parameter, socket.AF_INET, is a method call of the AF_INET method of the socket class. The parameter, socket.SOCK_STREAM, is a method call of the SOCK_STREAM method of the socket class.

Line 16 is a method invocation of the "connect" method from the class represented by the object "s." Line 18 is a method invocation of the "send" method of the class represented by the object "s". Line 19 sets the variable "buffer" to a list, [ ]. Lines 20-26 are in a loop. Line 22 assigns the variable "d" to the return result of the method call "s.recv (1024)", where "recv" is a method of the class represented by the object "s". Line 23 is an if statement testing if the value of "d" is true. Line 24 performs the method call "buffer.append(d)" when the value of "d" is true. "Append" is a method of the class associated with the object "buffer". Line 25 is an else statement and line 26 is a break statement that forces control out of the loop. Line 28 is a method call of the method "close" of the class associated with the object "s".

The feature selection and generation component 112 parses the source code 200 to determine a corresponding pseudo type for the program elements and to extract features from the method invocations. For example, line 16 contains the following line of source code: s.connect(('www.sina-.com.cn', 80)). From this line of source code the component 112 extracts the features shown in 204: SpanStart 206, IsInConditional 208, ClassInvoked 210, an Method/Property Invoked 212. The value of the SpanStart is 202, the IsInConditional is false, the ClassInvoked is socket.socket and the Method/PropertyInvoked is connect. The component 112 creates the pseudo type socket.socket for the method connect since the object s is assigned the result of the method call of socket.socket in line 13.

Line 24 contains the following line of source code: buffer.append(d). The component 112 extracts the following features 214 from this line of source code: SpanStart 216; IsInConditional 218; ClassInvoked 220; and Method/Property Invoked 222. The SpanStart has the value 520, the IsInConditional is false, the ClassInvoked is list, and the Method/PropertyInvoked is append. The component 112 assigns the pseudo type list as the class for this method invocation since buffer is assigned the built-in type list, [ ], in line 19.

Turning to FIG. 2B, there is shown an exemplary file output by the feature selection and generation component 112. The selected features 122 may be implemented, in one aspect, as a JSON file 202 having the pseudo types representing the classes and their associated features extracted from the source code file shown in FIG. 2A. Lines 25-28 represent a header for the file 230. Lines 29-42 represent the pseudo type socket which contains the methods socket, AF_INET, and SOCK_STREAM. Lines 43-60 represent the pseudo type socket.socket which contains the methods, connect, send, recv, and close. Lines 61-66 represent the pseudo type list which contains the method append. Each entry for a method includes values for SpanStart and IsInConditional.

FIG. 2C shows an exemplary file representing the machine learning model. In one aspect, the machine learning model is a second-order Markov chain model that predicts a method name associated with a sequence of method names for a particular pseudo type. The model is a sequential or chain model that is capable of modeling sequences of events. A Markov chain model relies on the assumption that each state is dependent on previous states. In a second order Markov chain, a state is dependent only on the immediately preceding two states. The transition probabilities are generated from the sequential usage patterns detected in the training data. There is a transition probability for the methods in the method sequence which is computed as $P(x_t|x_{t-1}, \ldots, x_{t-n}) = N_t/N_{total}$, where n is the order of the Markov chain, $N_t$ is the number of times $x_t$ comes after $x_{t-1}$ and $x_{t-2}$, $N_{total}$=total number of methods that come after $x_{t-1}$ and $x_{t-2}$ in the same pseudo type.

FIG. 2C illustrates an exemplary machine learning model derived from the extracted features shown in FIG. 2B and from the source code shown in FIG. 2A. In one aspect, the machine learning model is formatted as a JSON file 204. Line 66 identifies the model name and line 67 identifies that the file is a model. Lines 68-82 represent the entries of the model. Lines 68-70 represent the non-conditional-branch model for the pseudo type list, lines 71-75 represent the non-conditional-branch model for the pseudo type socket, and lines 76-81 represent the non-conditional-branch model for the pseudo type socket.socket. The method entries for each pseudo type are listed in order of highest probability to lowest probability.

FIG. 2C also illustrates an exemplary second order Markov chain model embodied as a set of lookup tables 242, 244, 246 (i.e., dictionary, key-value pair). In one aspect, there are at least two lookup tables for each pseudo type: one lookup table is for method invocations outside of an if-conditional and another lookup table is for method invocations within an if-conditional branch. The key into either table is a method invocation sequence of two previous method invocations in the same pseudo type. The corresponding entry in the table is a list of methods in the pseudo type ranked in order of highest probability for completing a current invocation to the method having the lowest probability.

As shown in FIG. 2C, lookup table 242 represents the non-conditional branch table for the list pseudo type. This table 242 is accessed with the null key, meaning there is no sequence of previous method invocations of the list pseudo type. There is only one method candidate which is append. Lookup table 244 represents the non-conditional branch table for the socket pseudo type. This table 244 is accessed with the null key, the method sequence null~socket, or the method sequence null~AF_INEF to obtain a respective method candidate. For the null key, the method name socket is returned as a candidate. When the method sequence is null~socket, method name AF_INEF is returned as a candidate. When the method sequence is null~AF_INEF, the method name SOCK_STREAM is returned. Lookup table 246 represents the non-conditional branch table for the socket.socket pseudo type. This table 246 is accessed with the null key, the method sequence null~connects, the method sequence connect~send or the method sequence send~recv to obtain a respective method candidate.

Attention now turns to description of the various exemplary methods that utilize the system and device disclosed herein.

Methods

Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
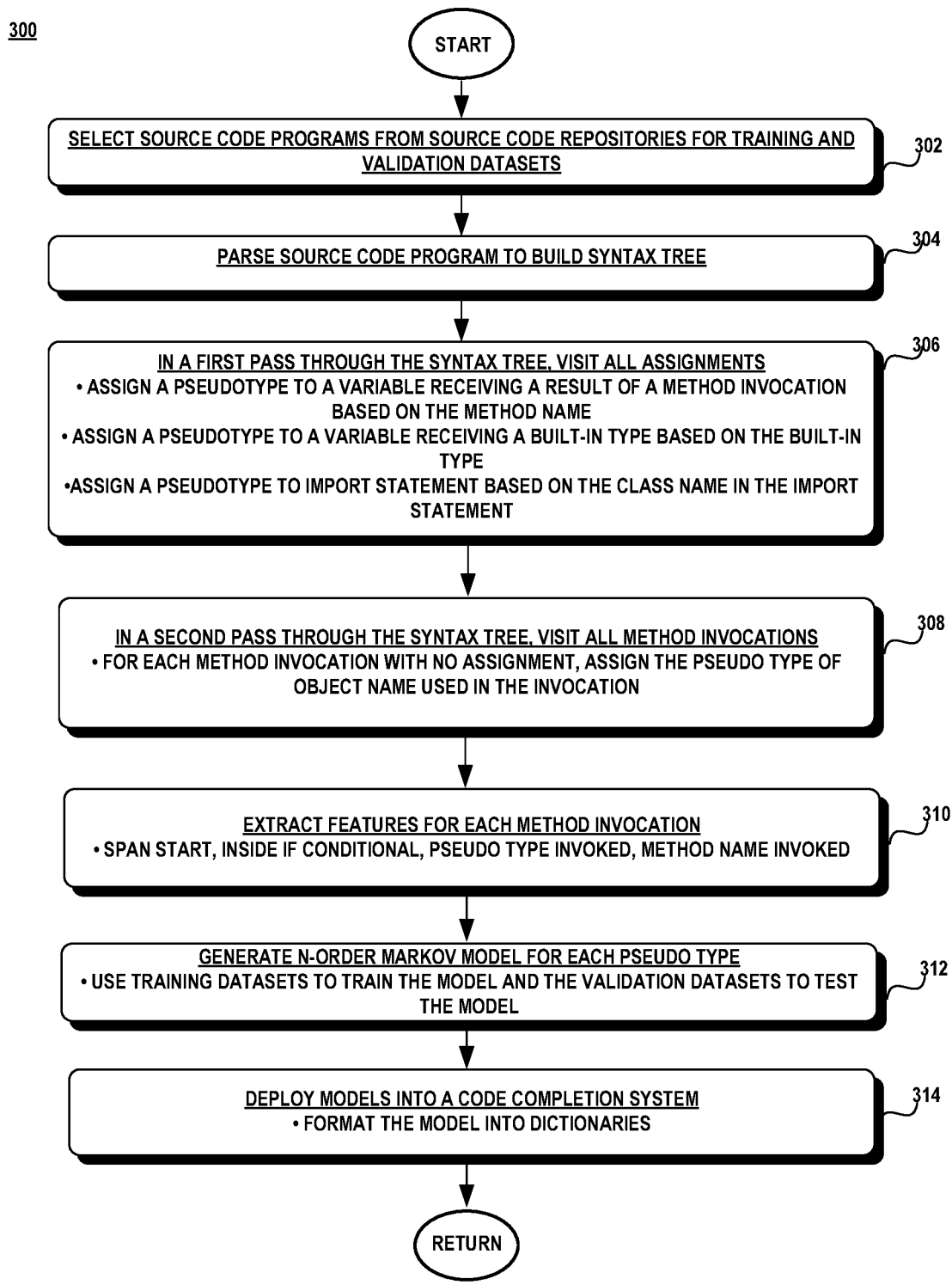
FIG. 3 is a flow diagram illustrating an exemplary method for training the machine learning model.

FIG. 3 illustrates an exemplary method illustrating the training of the machine learning model for code completion. Referring to FIGS. 1 and 3, one or more source code repositories 106 are searched for source code programs written in a target dynamically-typed programming language to generate training and validation datasets. The source code repositories 106 can be widely-used code repositories, such as GitHub, internal code repositories, and/or combinations thereof. The source code selection component 108 extracts a number and type of source code programs that meet an intended target, such as source code programs that are accessed frequently, source code programs that utilize a particular function (e.g., database operations, computer graphics programs, etc.), and the like. (Collectively, block 302).

The selected source code programs 110 are then parsed by the feature selection and generation component 112 to extract training and validation datasets to train the machine learning model. The feature selection and generation component 112 parses each selected source code program 110 into a parse tree or syntax tree 116. (Collectively, block 304).

In a first pass through the syntax tree, the feature selection and generation component 112 traverses the syntax tree to visit each assignment statement in the source code program. A pseudo type is created for each assignment statement. In an assignment statement where a variable is assigned the result of a method call or method invocation, the variable is assigned a pseudo type having the name of the method. For example, for the assignment statement f=open('test.text', 'r'), the variable f is assigned the pseudo type open where open is the name of the method whose result is assigned to f. (Collectively, block 306).

A pseudo type is created for an assignment statement where a variable is assigned a built-in type. A built-in type is a standard type built into the programming language's type system. For example, in Python, the principal built-in types are numerics (e.g., int, float, complex), sequences (e.g., list, tuple, range), mapping (e.g., dict), classes, instances, and exceptions.

As shown in FIG. 2A, line 19, the assignment statement, buffer=[ ], assigns a list, [ ], to the variable buffer. Since list is a built-in type, the pseudo type list is assigned to the variable buffer. Similarly, the name associated with an import statement is also used as a pseudo type. For example, as shown in FIG. 2A, line 10, the statement import socket is treated as an assignment statement and the pseudo type socket is created to represent those methods found inside the imported file. (Collectively, block 306).

In a second traversal of the syntax tree, each method invocation is visited. If the method invocation is not already associated with a pseudo type, a pseudo type is assigned to the object of the method invocation from the pseudo types assigned in the assignment statements. For example, consider the following Python code:

$$f=\text{open}('test.txt','r') \quad (1)$$

$$f.\text{close}(f) \quad (2)$$

In statement (1), the pseudo type open was assigned to the object f in the first pass. The method invocation in statement (2) is assigned the pseudo type open since the method close is part of the object f which was assigned the pseudo type open. The feature selection and generation component 112 searches each of the assignments from the first pass to find the pseudo type related to the method invocation. (Collectively, 308).

Once the pseudo types are generated, the feature selection and generation component 112 extracts the features from the method invocation. In one aspect, the features include the span start, indicator of the method invocation inside or outside of a conditional expression, the pseudo type, and the name of the method (block 310).

The features serve as the training and validation or testing datasets for the machine learning model. In one aspect, the features may be split with 80% used as training dataset and 20% used as the validation dataset (collectively, block 312).

The features in the training dataset are used by the machine language model generation component 124 to generate the models. The features are used to determine an order of the method invocations for each pseudo type. From the ordered list of method invocations, sequences of usage patterns can be detected. These patterns can then be partitioned into sequences having n+1 states, where n is the order of the Markov chain model. These sequences are then used to train a Markov chain model for each pseudo type which entails generating the states and transition probabilities (collectively, block 312).

The training data is analyzed to detect sequences of method invocations for each pseudo type. For an n-order Markov chain model, the number of specific n state method invocation sequences that occur is counted to order the n+1 states that occur thereafter by derived probabilities. The derived probability may be generated by the ratio of the number of times the n+1 state sequence occurs over the number of times the n state sequence occurs (block 312).

The models are then tested to ensure a target level of accuracy. The testing entails providing each model with test data and checking the recommendations that the model outputs. (block 312) When the recommendations achieve a certain level of accuracy, then the models are transformed into a dictionary or lookup table format and released (block 314).

Figure 4:
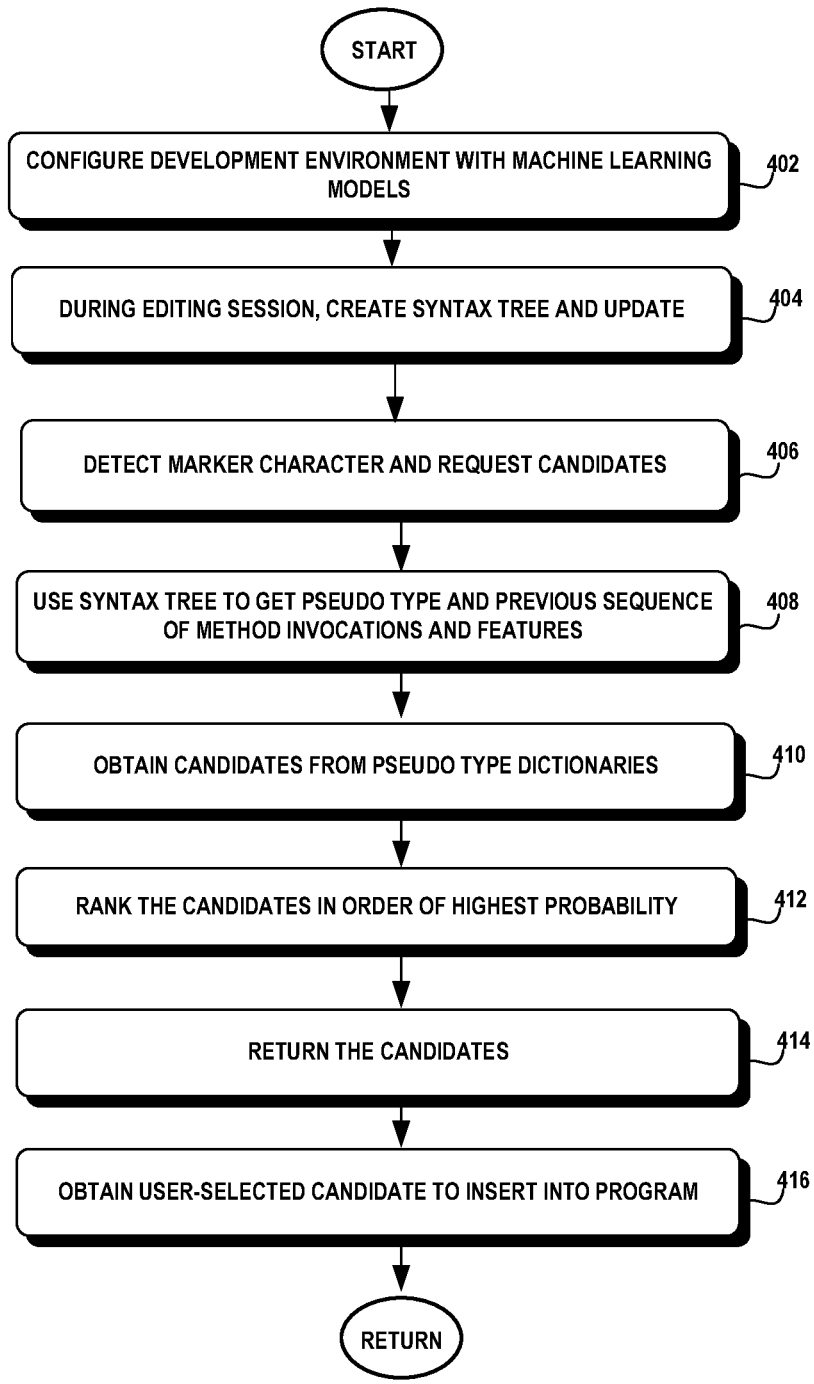
FIG. 4 is a flow diagram illustrating an exemplary method for utilizing the machine learning model for code completion.

FIG. 4 illustrates an exemplary method of code completion utilizing the machine learning models. Referring to FIGS. 1 and 4, code completion is performed in a development environment such as a source code editor 128 or IDE. The source code editor 128 is configured to interact with a code completion component 140 that utilizes the machine learning models in a lookup table format, such as the dictionaries 127 (block 402). The source code editor 128 performs a background parsing process that parses the source code in the source code editor to generate and update the syntax tree of the source code (block 404).

The user interface 130 of the source code editor 128 detects the input characters that a developer enters into the source code editor 128. When the user interface 130 detects a particular character that indicates code completion is needed for a method invocation at a current position in the source code editor 128, the user interface 130 requests candidates 144 from the code completion component 140. In one aspect, the detection of a period after an object name is used as the trigger to invoke code completion (Collectively, block 406).

The code completion component 140 utilizes the syntax tree generated during the source code editing session to obtain the previous method invocations that have occurred before the current position in the source code editor 130 and the characteristics of the context of the current method invocation, such as whether the current method invocation is inside an if-statement (block 408).

The code completion component 140 uses the syntax tree to determine the pseudo type associated with the object at the current position in the source code editor. The syntax tree representing the source code in the source code editor up to the current position is generated by the parser and sent to the code completion component 140. The code completion component 140 traverses the syntax tree to create pseudo types for each assignment statement and to associate a pseudo type to each method invocation whose result is not assigned. (Collectively, block 408).

The code completion component 140 utilizes the dictionaries 127 associated with each pseudo type to search for a method name most likely to complete the method invocation using the pseudo type associated with the object at the current position and the sequence of immediately preceding method invocations from the pseudo type. Once the code completion component 140 obtains the previous method invocations, an n-state sequence can be constructed and used as a key to access an appropriate dictionary. (Collectively, block 410).

If there is no such n-state sequence, then the dictionary is searched using an n−1 state sequence constructed from the previous n−1 method invocations having the same pseudo type. If the n−1 state sequence cannot be found in the dictionary, then the n−2 state sequence is used to search the dictionary. In an n-order Markov chain model, the n−1 state sequence will be stored as a new n state sequence with the first state marked as null. (Collectively, block 410).

The code completion component 140 may find one or more candidates from the dictionaries. In the event that there are multiple candidates, the code completion component 140 orders the recommendations by highest probability (block 412). The candidates are then returned to the user interface for display to the developer (block 414). A user-selected candidate may then be inserted into the source code program (block 416). The process is repeated each time a marker character is detected during the editing session.

Exemplary Operating Environment

Figure 5:
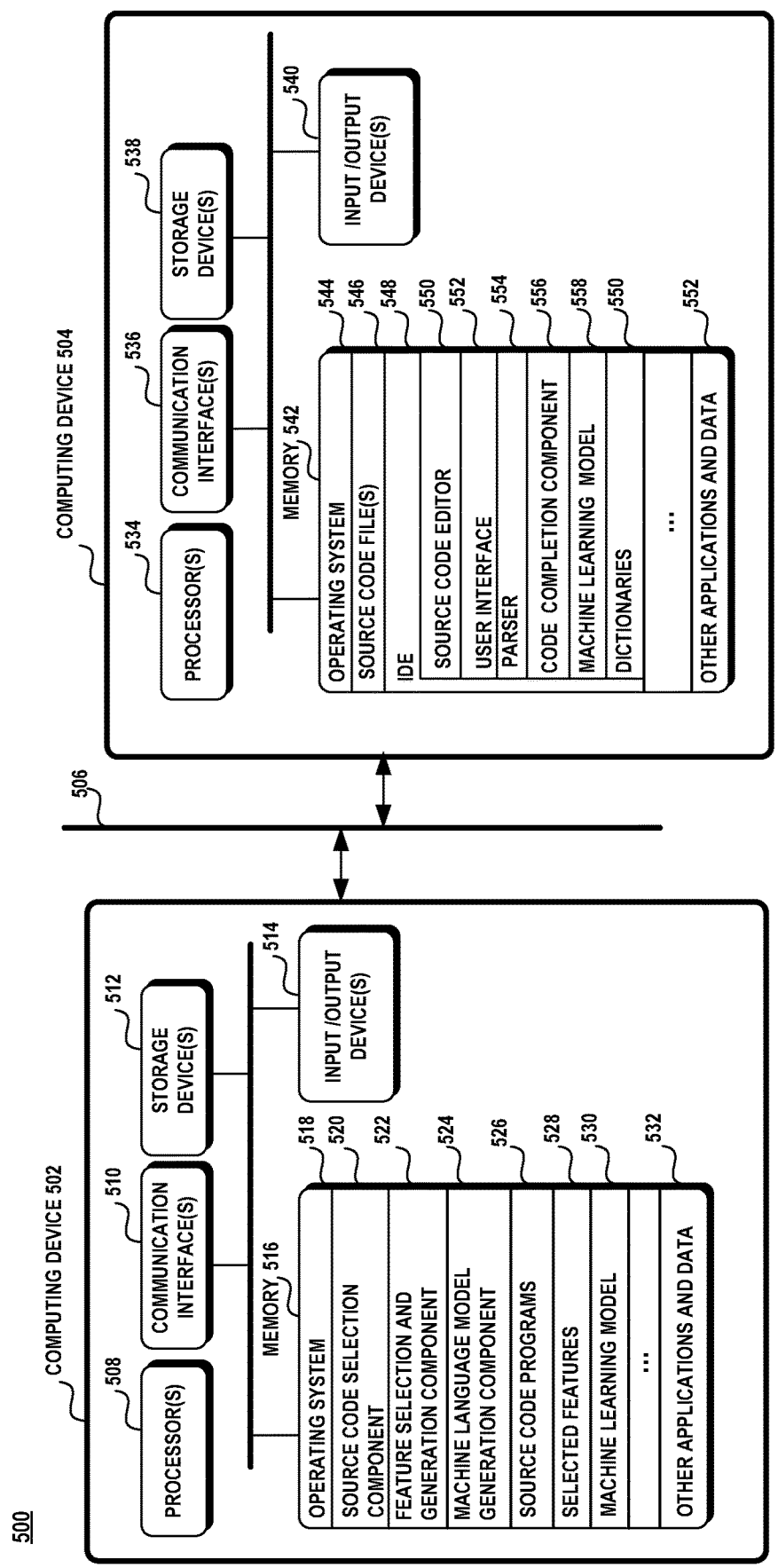
FIG. 5 is a block diagram illustrating an exemplary operating environment.

Attention now turns to a discussion of an exemplary operating environment. FIG. 5 illustrates an exemplary operating environment 500 in which a first computing device 502 is used to train the machine learning model and a second computing device 504 uses the machine learning model for code completion. However, it should be noted that the aspects disclosed herein is not constrained to any particular configuration of devices. Computing device 502 may utilize the machine learning model in its own code completion system and computing device 504 may generate and test machine learning models as well. Computing device 502 may be configured as a cloud service that generates the models as a service for other code completion systems. The operating environment is not limited to any particular configuration.

The computing devices 502, 504 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 600 may be configured in a network environment, a distributed environment, a multi-processor environment, or a stand-alone computing device having access to remote or local storage devices.

The computing devices 502, 504 may include one or more processors 508, 534, one or more communication interfaces 510, 536, one or more storage devices 512, 538, one or more input/output devices 514, 540, and at least one memory or memory device 516, 542. A processor 508, 534 may be any commercially available or customized processor and may include dual microprocessors and multi-processor architectures. The communication interface 510, 536 facilitates wired or wireless communications between the computing device 502, 504 and other devices. A storage device 512, 538 may be computer-readable medium that does not contain propagating signals, such as modulated data signals transmitted through a carrier wave. Examples of a storage device 512, 538 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 512, 538 in the computing devices 502, 504. The input/output devices 514, 540 may include a keyboard, mouse, pen, voice input device, touch input device, display, speakers, printers, etc., and any combination thereof.

A memory 516, 542 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 516, 542 may also include one or more external storage devices or remotely located storage devices that do not pertain to propagated signals, such as modulated data signals transmitted through a carrier wave.

Computing device 504 may utilize an integrated development environment (IDE) 548 that allows a user (e.g., developer, programmer, designer, coder, etc.) to design, code, compile, test, run, edit, debug or build a program, set of programs, web sites, web applications, and web services in a computer system. Software programs can include source code files created in one or more source code languages (e.g., Visual Basic, Visual J #, C++. C#, J#, Java Script, APL, COBOL, Pascal, Eiffel, Haskell, ML, Oberon, Perl, Python, Scheme, Smalltalk and the like). The IDE may provide a native code development environment or may provide a managed code development that runs on a virtual machine or may provide a combination thereof. The IDE may provide a managed code development environment using the .NET framework. It should be noted that this operating embodiment is not constrained to providing the source code development services through an IDE and that other tools may be utilized instead, such as a stand-alone source code editor and the like.

A user can create and/or edit the source code files 546 according to known software programming techniques and the specific logical and syntactical rules associated with a particular source language via a user interface 552 and a source code editor 550 in the IDE 548. Thereafter, the source code files 546 can be parsed via a parser 554, such as a front end or language compiler. During this parsing process, the parser generates data structures representing the context of method invocations of the source code.

The memory 542 may contain instructions, components, and data. A component is a software program that performs a specific function and is otherwise known as a module, program, and/or application. The memory 542 may include an operating system 544, one or more source code files 546, an IDE 548 that may include a source code editor 550, a user interface 552, a parser 554, a code completion component 556, a machine learning model 558, the dictionaries 550, and other applications and data 552. Memory 516 may include an operating system 518, a source code selection component 520, a feature selection and generation component 522, a machine learning model generation component 524, source code programs 526, selected features 528, a machine learning model 530, and other applications and data 532.

The computing devices 502, 504 may be communicatively coupled via a network 506. The network 506 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 506 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A system is disclosed having one or more processors and at least one memory device communicatively coupled to the one or more processors. The system also has one or more programs, wherein the one or more programs are stored in the memory device and are configured to be executed by the one or more processors. The one or more programs include instructions that: detect a user inputting a marker character while editing source code written in a dynamically-typed programming language, the marker character in a code fragment initiating a method invocation; determine a pseudo type for an object subject to the method invocation; obtain, from a machine learning model, at least one candidate method name to complete the code fragment; and input a user-selected method name into the source code.

The one or more programs include further instructions that: parse a portion of the source code preceding the marker character; generate a pseudo type for the object subject to the method invocation from the parsed portion of the source code; and input the pseudo type into the machine learning model to obtain the at least one candidate method name. The one or more programs include further instructions that: generate a pseudo type for each assignment assigned a return value from a method invocation, the pseudo type for each assignment having a method name associated with the method invocation. Further instructions perform actions that: associate a pseudo type for each method invocation not having been assigned a type using the pseudo types generated for each of the assignments. In one or more implementations, the one or more programs include further instructions that: generate an n-ordered sequence of method invocations that precede the marker character having the same pseudo type as the object subject to the method invocation; and input the n-ordered sequence into the machine learning model to obtain the at least one candidate method name. The machine learning model is an n-order Markov chain model.

A method is disclosed comprising: generating, at a computing system having at least one processor and a memory, pseudo types for one or more variables assigned a return result of a method invocation in one or more source code programs, the one or more variables not assigned a type; assigning pseudo types to one or more method invocations in the one or more source code programs, not associated with a type, based on the pseudo types generated for the one or more variables; obtaining patterns of method invocations within the one or more source code programs; and training a machine learning model based on the patterns of method invocations to determine a method name associated with a select pseudo type to complete a code fragment initiating a method invocation having the select pseudo type.

Generating pseudo types for one or more variables in one or more source code programs further comprises: associating a pseudo type with a method name corresponding to the method invocation whose return value is assigned to a select one of the one or more variables. In another implementation, generating pseudo types for one or more variables in one or more source code programs further comprises: associating a pseudo type with a name corresponding to an import statement to a select one of the one or more variables. In yet another implementation, generating pseudo types for one or more variables in one or more source code programs further comprises: associating a pseudo type with a built-in type corresponding to the built-in type assigned to a select one of the one or more variables.

Obtaining patterns of method invocations within each pseudo type further comprises: extracting features from one or more method invocations in the one or more source code programs, the features representing a syntactic context of the one or more method invocations. The features include a pseudo type assigned to a method invocation, a span start of the method invocation, and/or an if-conditional indicator. The machine learning model is an n-order Markov chain model.

Training a machine learning model based on the patterns of method invocations to determine a method name associated with a select pseudo type to complete a code fragment initiating a method invocation having the select pseudo type, further comprises: grouping the patterns of method invocations within the one or more source code programs based on a same pseudo type. Training a machine learning model based on the patterns of method invocations to determine a method name associated with a select pseudo type to complete a code fragment initiating a method invocation having the select pseudo type, further comprises: computing a frequency that an invoked method associated with a first pseudo type follows a sequence of method invocations associated with the first pseudo type; and assigning a probability to the invoked method based on the computed frequency, wherein the probability represents a likelihood that the invoked method completes a code fragment initiating a method having the first pseudo type.

A device is disclosed having at least one processor and at least one memory device. The at least one processor is configured to: detect a marker character input by a user in a source code program, wherein the source code program is written in a dynamically-typed programming language, wherein the marker character indicates initiation of a first method invocation, the marker character following an object name; obtain a pseudo type associated with the object name; search a dictionary associated with the pseudo type associated with the object name to obtain at least one method name to complete the first method invocation; and input a user-selected method name from the at least one method name to complete the first method invocation.

The at least one processor is further configured to: generate the dictionary from an n-order Markov chain model, wherein the n-order Markov chain model is trained on usage patterns of method invocations in a plurality of source code programs written in the dynamically-typed programming language, wherein the method invocations are assigned a corresponding pseudo type. The at least one processor is further configured to: parse a portion of the source code program preceding the marker character to assign a pseudo type to each variable not associated with a type; and assign a pseudo type to the object name based on the pseudo types assigned to variables in the portion of the source code program. The at least one processor is configured to: generate a sequence of method invocations preceding the marker character having a same pseudo type as the assigned pseudo type. The at least one processor is configured to: access the dictionary using the assigned pseudo type and the sequence of method invocations preceding the marker character.

The invention claimed is:
1. A method, comprising:
generating, at a computing system having at least one processor and a memory, pseudo types for one or more variables assigned a return result of a method invocation in one or more source code programs, the one or more variables not assigned a type;

assigning the generated pseudo types to one or more method invocations in the one or more source code programs, not associated with a type;

obtaining features of the method invocations within the one or more source code programs, a feature including a generated pseudo type associated with the method invocation, a method name of the method invocation, and a location of the method invocation in a source code program; and training a machine learning model, to learn patterns of ordered sequences of method invocations, based on the features of the method invocations, to determine a method name associated with a select pseudo type to complete a code fragment initiating the method invocation having the select pseudo type.

2. The method of claim 1, wherein generating the pseudo types for one or more variables in one or more source code programs further comprises: associating the pseudo type with a method name corresponding to the method invocation whose return value is assigned to a select one of the one or more variables.

3. The method of claim 1, wherein generating the pseudo types for one or more variables in one or more source code programs further comprises: associating the pseudo type with a name corresponding to an import statement to a select one of the one or more variables.

4. The method of claim 1, wherein generating the pseudo types for one or more variables in one or more source code programs further comprises: associating the pseudo type with a built-in type corresponding to the built-in type assigned to a select one of the one or more variables.

5. The method of claim 1, wherein obtaining features of the method invocations further comprises: extracting features from the one or more method invocations in the one or more source code programs, the features representing a syntactic context of the one or more method invocations.

6. The method of claim 5, wherein the features include a span start of the method invocation, and/or an if-conditional indicator.

7. The method of claim 1, wherein the machine learning model is an n-order Markov chain model.

8. The method of claim 7, wherein training the machine learning model further comprises:

computing a frequency that an invoked method associated with a first pseudo type follows a sequence of the method invocations associated with the first pseudo type; and assigning a probability to the invoked method based on the computed frequency, wherein the probability represents a likelihood that the invoked method completes a code fragment initiating a method having the first pseudo type.

9. The method of claim 1, wherein training the machine learning model further comprises:

grouping the patterns of the method invocations within the one or more source code programs based on a same pseudo type.

10. A system comprising:
one or more processors;
at least one memory device communicatively coupled to the one or more processors; and
one or more programs, wherein the one or more programs are stored in the memory device and configured to be executed by the one or more processors, the one or more programs including instructions that:
detect a user inputting a marker character while editing source code written in a dynamically-typed programming language, the marker character in a code fragment initiating a method invocation;
determine a pseudo type for an object subject to the method invocation;
obtain an ordered sequence of method invocations that precede the marker character having a same pseudo type as the determined pseudo type;
obtain, from a machine learning model, at least one candidate method name to complete the method invocation based on the determined pseudo type and the ordered sequence of method invocations; and
input a user-selected method name from the at least one candidate method name into the source code.

11. The system of claim 10, wherein the one or more programs include further instructions that:
assign the pseudo type for the object subject to the method invocation from a set of pseudo types generated from assignment statements and import statements.

12. The system of claim 10, wherein the one or more programs include further instructions that: generate the pseudo type for a variable assigned a return value from a method invocation based on a method name of the method invocation, when the variable is not assigned a type.

13. The system of claim 10, wherein the one or more programs include further instructions that: generate the pseudo type for a variable receiving a built-in type and not associated with a type, the generated pseudo type based on the built-in type.

14. The system of claim 10, wherein the one or more programs include further instructions that: generate the pseudo type for methods of an import statement, the generated pseudo type having a name of the import statement.

15. The system of claim 10, wherein the machine learning model is an n-order Markov chain model.

16. A device, comprising:
at least one processor and at least one memory device;
wherein the at least one processor is configured to:
detect a marker character input by a user in a source code program, wherein the source code program is written in a dynamically-typed programming language, wherein the marker character indicates initiation of a first method invocation, the marker character following an object name receiving a result of the first method invocation;
obtain a pseudo type associated with the object name from a plurality of pseudo-types;
obtain an ordered sequence of method invocations preceding the first method invocation having a same pseudo type as the pseudo type of the object name;
search a dictionary associated with the pseudo type of the object name with the ordered sequence of method invocations to obtain at least one method name to complete the first method invocation; and
input a user-selected method name from the at least one method name to complete the first method invocation.

17. The device of claim 16, wherein the at least one processor is configured to: generate the dictionary from an n-order Markov chain model, wherein the n-order Markov chain model is trained on usage patterns of the method invocations in the plurality of source code programs written in the dynamically-typed programming language, wherein the method invocations are assigned a corresponding pseudo type.

18. The device of claim 16, wherein the pseudo type includes a method name of a method invocation for a variable assigned a return value from the method invocation when the variable is not assigned a type.

19. The device of claim 18, wherein the pseudo type includes a built-in type associated with a variable not having a type and wherein the variable receives a value having the built-in type.

20. The device of claim 19, wherein the pseudo type includes method names derived from an import statement.

\* \* \* \* \*